Nov. 28, 1967 R. W. CRAIG ET AL 3,355,193
SERVICE CONNECTION CLAMP
Filed March 23, 1966 2 Sheets-Sheet 1

INVENTORS
ROBERT W. CRAIG
MARVIN G. SPITZER
BY JOE E. YONKER
Cushman, Darby & Cushman
ATTORNEYS

INVENTORS
ROBERT W. CRAIG
MARVIN G. SPITZER
BY JOE E. YONKER

ATTORNEYS

United States Patent Office 3,355,193
Patented Nov. 28, 1967

3,355,193
SERVICE CONNECTION CLAMP
Robert W. Craig, Marvin G. Spitzer, and Joe E. Yonker, Decatur, Ill., assignors to Mueller Co., Decatur, Ill., a corporation of Illinois
Filed Mar. 23, 1966, Ser. No. 536,719
4 Claims. (Cl. 285—197)

ABSTRACT OF THE DISCLOSURE

A service connection clamp for connecting a main pipe line or the like with a service pipe line and including a flexible band having an interior surface provided with a noncircular recess, the noncircular recess having a hole therethrough and an outlet fitting having a noncircular base with a service pipe line receiving portion extending outwardly through the hole in the recess. The connection clamp further including a gasket secured to the flexible band for retaining the outlet fitting in the recess of the band prior to application of the unit to a main.

---

The present invention relates to improvements in service connection clamps for providing a service outlet whereby a main pipe line may be connected to a service pipe line.

In fluid distribution systems employing a main pipe line for conducting gas and/or liquid fluids under pressure, it is oftentimes desirable to connect the main pipe line with a service pipe line of smaller diameter than the main line. Since the precise location of connection between the main pipe line and the service pipe line is usually not known at the time the main pipe line is laid, various means have been proposed to facilitate the connection of the service line to the main pipe line at a selected point with a minimum disturbance to the main pipe line.

Prior proposed service outlet devices have included rigid cast metal clamps made in two or more parts with an outlet on one of the parts, the parts being adapted to fully encircle the main pipe line. Another type of service outlet included a ported rigid saddle member arranged to be strapped to the main pipe line in sealing engagement therewith. Such rigid devices are, of course, limited to use on pipes of specific size and diameter and are not effective when used to repair a main pipe. More recently, mounting arrangements of a service outlet member have been made utilizing a flexible band with an outlet therein, the band being strapped about the main pipe line at the selected location for the outlet. The difficulty of such prior flexible band arrangements was that the outlet fitting had to be welded to the band and oftentimes the weld of the outlet fitting would crack when a torque was applied to the outlet fitting in the attachment of the service pipe line. The cost of manufacture of such a service connection clamp was also high as it was necessary to make the outlet fitting for the band of stainless steel, so that it could be welded to the steel band. Additionally, the adaptability of the service connection clamp was limited to an exact diameter main pipe as the rigidity between the outlet fitting and the band was such that it could not accommodate for pipes of slightly different diameters.

An object of the present invention is to provide an improved service connection clamp utilizing a flexible band, an outlet fitting, and a gasket, the outlet fitting being supported on the band prior to installation merely by means of the gasket adhesively secured or bonded to the interior surface of the band.

Ancillary to the immediately preceding object, it is a further object of the present invention to mount an outlet fitting on a flexible band for a service connection clamp in such a manner that the band and the outlet fitting may have slight relative movement of one another as the band is tightened so that the service connection clamp can adapt itself to various discrepancies and irregularities in pipe diameters and sizes.

A further object of the present invention is to provide an improved service side outlet means for connecting a main pipe line to a service pipe line, the outlet fitting being supported in a non-circular recess provided in the band to thereby insure against turning of the outlet fitting relative to the band when the service pipe line is connected thereto.

Still another object of the present invention is to provide a service connection clamp including a flexible band with a service outlet fitting, the band and the fitting being so designated that they may be assembled relative to one another at a minimum of cost and labor and yet when the service connection clamp is applied to a main pipe line, the service connection clamp provides an effective leak proof connection between itself and the main pipe line.

Additionally, it is an object of the present invention to provide a service connection clamp for connecting a main pipe line to a service pipe line, the clamp also being capable of use in repairing mains at a point where a connection to a service pipe line is desired.

These and other objects and advantages of the present invention will appear more fully in the following specification, claims and drawings in which:

FIGURE 1 discloses an end view of the service connection clamp of the present invention with a portion of the clamp in the area of the outlet fitting being illustrated in section;

Figure 1:
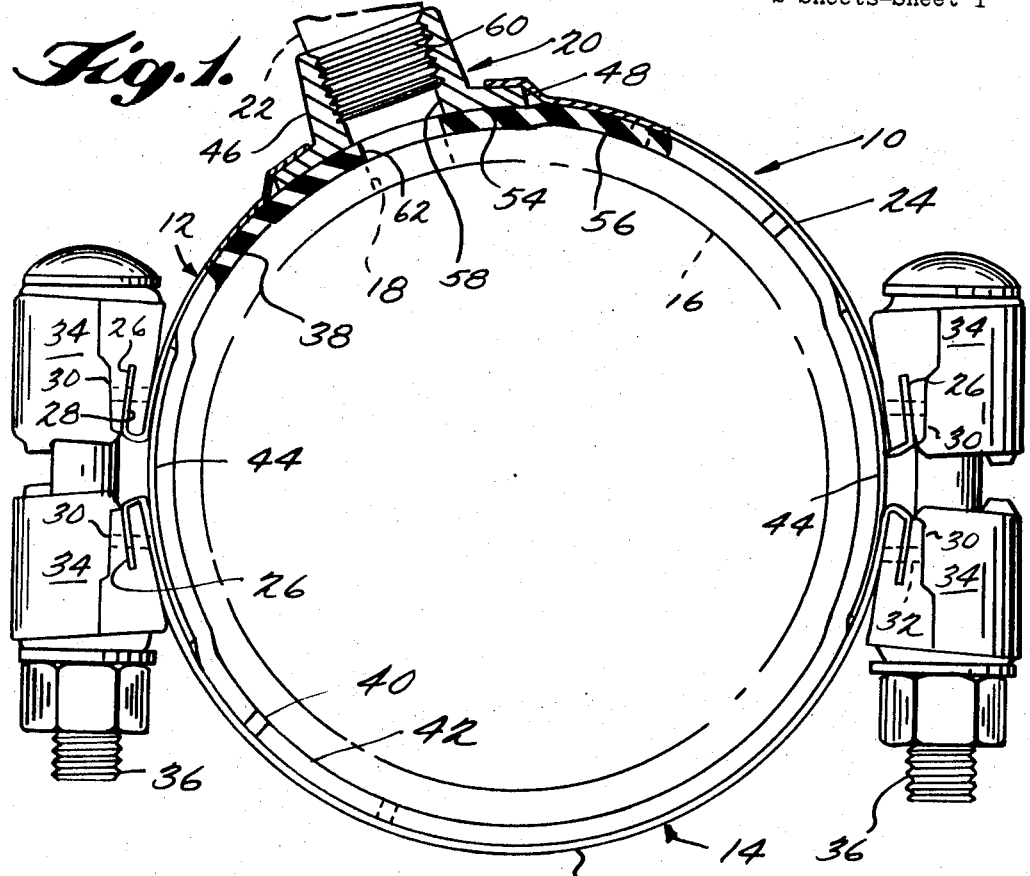

Referring now to the drawings wherein like character and reference numerals represent like and similar parts, the service connection clamp of the present invention is generally indicated at 10 and includes two parts 12 and 14 which are adapted to fully encircle a main pipe line 16 shown in phantom lines, the main pipe line having an opening 18 therein which is usually drilled or perforated after the clamp is applied. It will be understood that the main pipe line 16 may be a thin walled section as illustrated or may be of other well known pipe sections and pipe material. While the service connection clamp has been disclosed as comprising two parts each with a flexible metal band 24, it will be understood that the clamp could be of one part construction by providing a band of a length which would substantially encircle the main pipe line 16.

The parts 12 and 14 of the service connection clamp 10 are similarly constructed except for the novel service outlet means generally designated at 20 on the part 12. It will be appreciated that the outlet means 20 is adapted to be connected to a service pipe line 22 shown in broken lines in FIGURE 1. Each of the parts 12 and 14 comprise the flexible metal band 24 of selected width and length, the band being made of a suitable rust resistant, non-corrosive metal material such as bronze or stainless steel. Each metal band 24 is curved to provide a generally semi-circular portion having a radius of curvature corresponding generally to the outer radius of the cylindrical exterior surface on the main pipeline 16. Each of the metal bands 24 has at each of its ends, a return flange 26 adapted to be fixedly held in a slot 28 provided in a clamping lug 30. Rivets 32 or the like extending through the lugs 30 may be used to hold the flanges 26 in the slots 28 and the lugs 30 may be made of grey iron or annealed cast iron. Each lug 30 extends for the entire width of the band 24 and is provided with at least a pair of longitudinally spaced bosses 34 having bores therethrough for receiving nut and bolt assemblies 36. It will now be obvious that the nut and bolt assemblies 36 are utilized for drawing the adjacent band members 24 toward each other to tighten the same evenly about the main pipe line 16. While a particular type of lug 30 with bosses 34 is disclosed, the present invention is not limited to such an arrangement as other means for drawing the bands about the main pipe line may be utilized.

Figure 4:
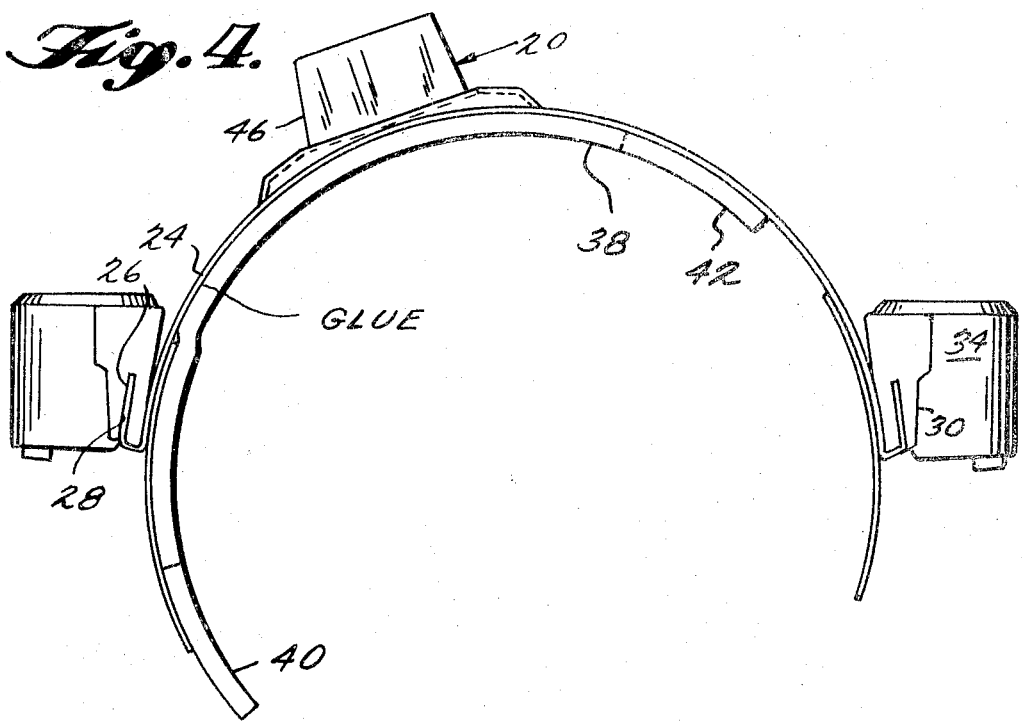
FIGURE 4 is an end elevational view of the upper band member of the service connection clamp of FIGURE 1, the view illustrating the position of the gasket adhesively secured to the inner surface of the flexible band member.
Figure 5:
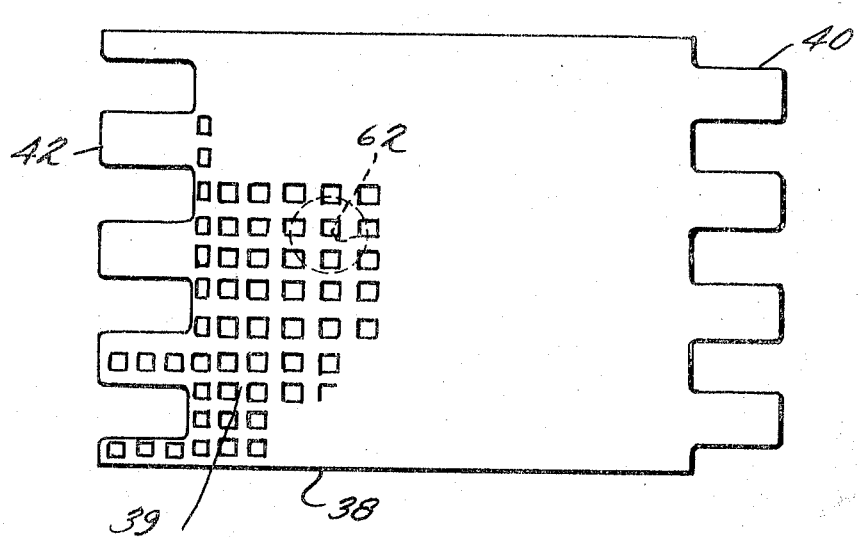
FIGURE 5 is a plan view of the gasket used with each of the flexible band members of the clamp of FIGURE 1, the gasket being provided with interlocking fingers at its ends.

The service connection clamp 10 also includes a gasket member 38 (FIGURE 5) having fingers 40 and 42 at its respective ends. One gasket member 38 is attached to each flexible band 24 on the interior surface of the band by a suitable adhesive or other bonding material. The fingers 40 and 42 are arranged for interlocking engagement when the two parts 12 and 14 are clamped about the main pipe line 16. Further, it will be noted by reference to FIGURE 4, that the gasket member 38 for each flexible band 24 is arranged so as to underline an adjacent band 24 so that the joint line between two adjacent ends of the gasket members 38 will not occur beneath the spaced ends of the bands. The gasket members 38 which are made of a flowable material, are provided with an interior surface of waffle grid design as indicated at 39 so as to provide tighter uniform sealing with the main.

A metal shim 44 is provided for spanning the joint or space between the supporting lugs 30. The shims 44 serve the purpose of gradually and progressively increasing pressure when the clamp is applied to the pipe so that there is uniform tightening pressure on the gaskets 38.

Figure 3:
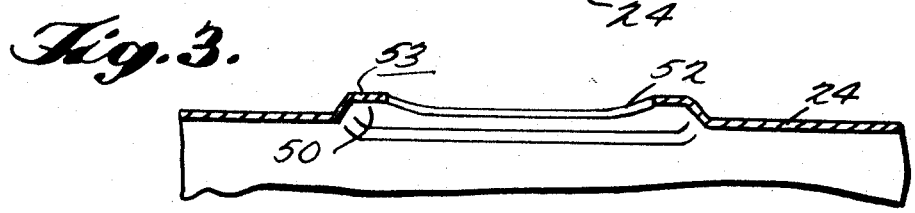
FIGURE 3 is a sectional view taken substantially on the line 3—3 of FIGURE 2.
Figure 2:
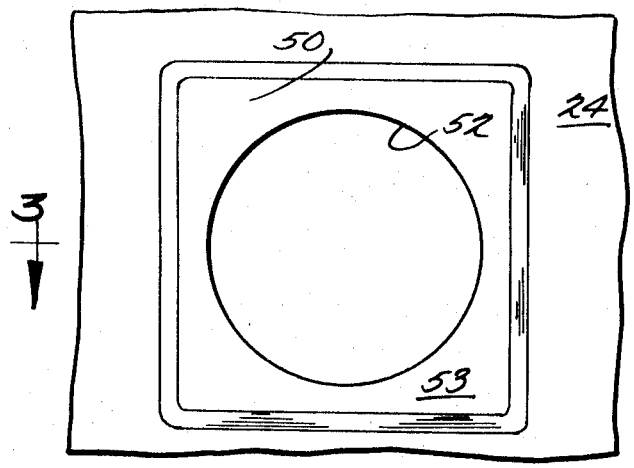
FIGURE 2 is a fragmentary plan view of the flexible band of the clamp of FIGURE 1, the view being from the interior of the band illustrating the non-circular recess on the interior surface of the band for receiving the base of the outlet fitting.

The present invention is directed primarily to the construction of the outlet fitting 20 and the metal band 24 to which it is attached and to the means of retaining the outlet fitting on the band. In more detail, the outlet fitting 20 which is preferably molded from brass includes a substantially cylindrical portion 46 and a base portion 48 at one end of the portion 46. The base portion 48 is non-circular in shape and is arranged to be received in a complementary shaped non-circular recess 50 stamped in the interior surface of the flexible band 24. It will be noted by reference to FIGURES 2 and 3, that the non-circular recess 50 which is substantially square in shape although not limited to this particular shape, is provided with a circular hole or opening 52 in its stamped or pressed out surface 53. The cylindrical portion 46 of the outlet fitting 20 extends through the hole 52 and the base portion is received in the recess 50. Further, it will be noted that the thickness of the base portion 48 of the outlet fitting 20 when considered on a radius of the clamp 10 of FIGURE 1, is slightly greater than the depth of the recess 50 in the metal band 24 so that when the outlet fitting 20 is positioned with its non-circular base within the non-circular recess, the interior surface 54 of the base portion extends slightly radially inwardly of the interior surface 56 of the band 24. By having the non-circular base portion 48 of the outlet fitting 20 complementary in shape to the non-circular recess 50 of the band 24, the fitting 20 cannot turn when the service pipe 22 is screwed into the cylindrical portion 46. As shown in FIGURE 1, the cylindrical portion 46 and the base portion 48 have a bore 58 therethrough which is interiorly threaded at 60 for receiving the threaded end of the service pipe. Of course, other arrangements for connecting the service pipe to the fitting 20 may be provided such as a coupling which may be threaded into fitting 20.

The flowable gasket 38 on the band 24 having the outlet fitting 20 is provided with a hole 62 which aligns with the bore 58 in the outlet fitting 20. The hole 62 may be provided in the gasket 38 after the gasket has been adhesively secured to the band 24 with the outlet fitting 20 in place. It will now be appreciated that even while the outlet fitting 20 is not welded or soldered to the band 24, the outlet fitting 20 is held in place on the part 12 by the band 24 and gasket 38 prior to part 12 application to the main pipe. This arrangement of elements results in a simple and inexpensive means of assembly.

As mentioned above, the base portion 48 of the outlet fitting 20 is prevented from turning due to the fact that it has a complementary non-circular shape to the non-circular shape of the recess 50. Additionally, the interior surface 54 of the base portion 48 is concave on an axis parallel to the axis of the band 24 and thus conforms generally to the exterior surface of the main pipe line 16. This arrangement and design of the outlet fitting 20 also assists in the prevention of turning of the outlet fitting 20 during the attachment of the service pipe line 22 to the outlet fitting. While it has been previously mentioned that the lower surface 54 of the base portion 48 extends slightly below the interior surface 56 of the metal band 24, the purpose of this arrangement is to provide better sealing in the area of the outlet fitting. As shown in the drawings in FIGURE 1, in an exaggerated manner, the gasket 38 bulges slightly inwardly in the area of the base portion 48 of the outlet fitting 20. Of course, when the parts 12 and 14 are tightened about the exterior of the main pipe line 16, the gasket material in this area will flow due to the pressure applied so as to conform to the exterior surface of the main pipe line 16 as well as the interior of the base portion 48 of the outlet fitting 20. This is also true in the area of the shims 44 between the adjacent ends of the bands 24. Because of the waffle grid interior surface 39 of the gasket 38, the uniform tightening of the parts 12 and 14 results in uniform sealing around the entire main pipe line 16.

Having set forth the nature, objects and advantages of the present invention, in the specification and drawings, it will be understood that certain changes, adjustments and modifications may be made to the service connection clamp described herein without departing from the principle and spirit of the invention.

Therefore, the terminology used throughout the specification and the details of the drawings are but for the purpose of description and not limitation, the scope of the invention being defined in the claims.

What is claimed is:

1. A service side outlet means for connecting a main pipe line or the like with a service pipe line comprising: a flexible band having a selected width and a selected radius of curvature about a band axis, said band having an interior surface provided with a non-circular recess, said non-circular recess having a hole therethrough; an outlet fitting having a non-circular base complementary to and received in said non-circular recess of said band and a service pipe line receiving portion extending outwardly through the hole in said non-circular recess, said noncircular base having a thickness greater than the depth of said recess in said band whereby the base projects inwardly of the interior surface of said band when received in the recess and said outlet fitting having a bore therethrough; a gasket member carried by said flexible band on the interior surface thereof, said gasket member covering all of the interior surface of the base of said outlet fitting and at least a portion of the interior surface of said band surrounding the recess, said gasket member having a port therein aligned with the bore in said outlet fitting and said gasket member being adhesively secured to the interior surface of said band after said outlet fitting is positioned with its base in said recess whereby said gasket member retains said outlet fitting in position prior to use of the service side outlet means; and means for retaining said band on the main pipe line with the outlet fitting projecting therefrom.

2. A service fitting outlet means as claimed in claim 1 in which the non-circular base of said outlet fitting has a concaved interior surface substantially conforming to the contour of the exterior surface of the main pipe line.

3. A service side outlet means as claimed in claim 1 in which said means for retaining the band on said main pipe line includes a second flexible band having a radius of curvature substantially the same as the radius of curvature of said first mentioned band and clamp means on each end of both of said bands, the clamp means on adjacent ends of the respective bands when the bands are positioned about the main pipe line being cooperable to tightly clamp the band about the main pipe line.

4. A service side outlet means as claimed in claim 1 in which the bore in said outlet fitting at the exterior end thereof is interiorly threaded for receiving the service pipe line.

References Cited

UNITED STATES PATENTS

| | | | |
|---|---|---|---|
| 1,659,470 | 2/1928 | Owen et al. | 285—197 |
| 2,477,429 | 7/1949 | Swanstrom et al. | 151—41.76 |
| 2,553,342 | 5/1951 | Trageser | 285—330 |
| 2,703,721 | 3/1955 | Montgomery | 285—197 |
| 2,936,186 | 5/1960 | Dunmire | 285—373 |
| 2,945,704 | 7/1960 | Korn | 151—41.71 |
| 2,997,316 | 8/1961 | Recht | 285—197 |
| 3,115,889 | 12/1963 | Frank et al. | 285—197 |
| 3,189,970 | 6/1965 | Barr | 285—373 |
| 3,272,534 | 9/1966 | Smith | 285—197 |

FOREIGN PATENTS

| | | |
|---|---|---|
| 1,087,435 | 2/1955 | France. |
| 852,326 | 10/1960 | Great Britain. |

EDWARD C. ALLEN, *Primary Examiner.*

W. L. SHEDD, CARL W. TOMLIN, *Examiners.*